May 15, 1962 L. J. SCHNEIDER ET AL 3,034,317
APPARATUS FOR MAKING FLAKE ICE
Original Filed Feb. 18, 1959 2 Sheets-Sheet 1

INVENTORS:
LOUIS J. SCHNEIDER
RUSSELL F. HACKMAN
BY
Kegan, Bellamy & Kegan
ATTORNEYS May 15, 1962 L. J. SCHNEIDER ET AL 3,034,317
APPARATUS FOR MAKING FLAKE ICE
Original Filed Feb. 18, 1959 2 Sheets-Sheet 2
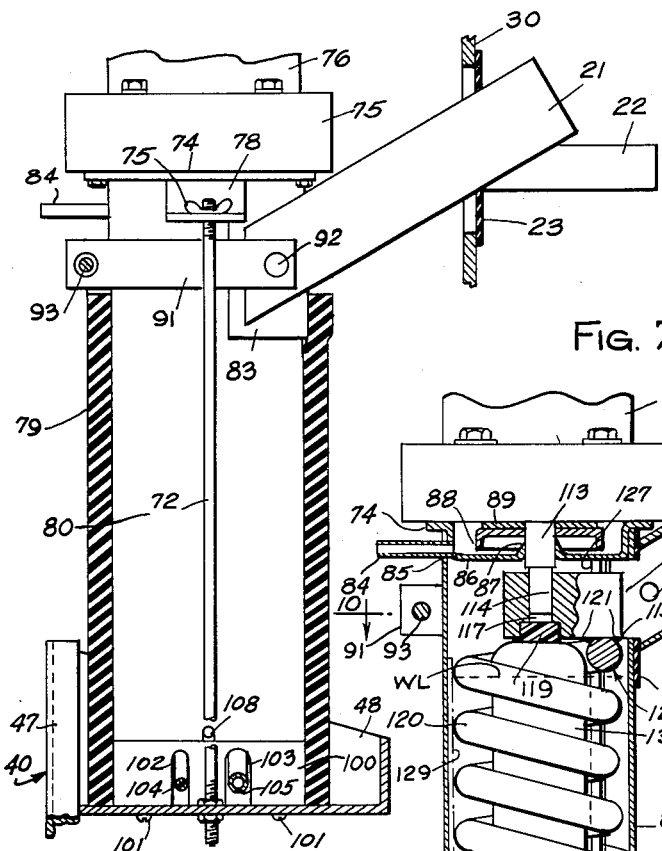
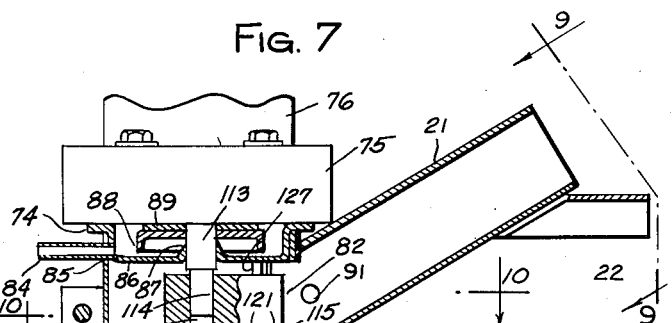
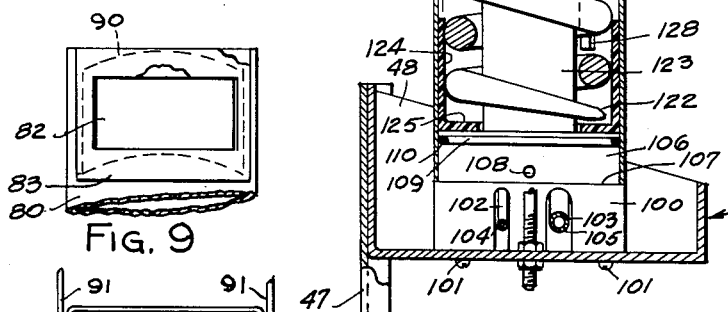
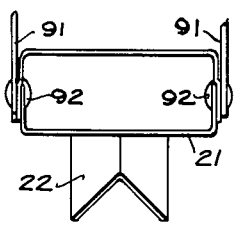
INVENTORS:
LOUIS J. SCHNEIDER
RUSSELL F. HACKMAN
BY
Kegan, Bellamy & Kegan
ATTORNEYS

United States Patent Office 3,034,317
Patented May 15, 1962

3,034,317
APPARATUS FOR MAKING FLAKE ICE
Louis J. Schneider and Russell F. Hackman, Chicago, Ill., assignors to Ross-Temp, Inc., Chicago, Ill., a corporation of Illinois
Original application Feb. 18, 1959, Ser. No. 794,010. Divided and this application July 18, 1960, Ser. No. 43,620
4 Claims. (Cl. 62—298)

This invention relates to apparatus for making flake or chip ice as a continuous process. Its principal object is to provide an economical and commercial form of the apparatus, with addditional general objects being to provide the apparatus in readily serviceable form to meet encountered commercial conditions, as well as to meet all reasonable sanitary requirements concerning ice produced for use in direct-contact cooling of drinks and food products generally.

This is a division of the present inventors' application Serial No. 794,010 filed February 18, 1959 and entitled "Apparatus for Making Flake Ice."

Heretofore, it has been proposed to produce chipped or flaked ice in an upstanding cylindrical vessel kept continuously supplied with water and containing an upstanding cylindrical freezer tube surrounded by the water in the vessel to continuously produce sheet-like ice around the freezer tube, with a continuously rotating spiral auger surrounding the freezer tube to continuously chip or flake off the ice as it is formed on the freezer tube and convey it upwardly through the surrounding water to a point of lateral discharge from the vessel above the water level.

Difficulty has been encountered in cleaning and sterilizing the ice-making vessel and included parts as heretofore constructed; and apparatus failures which cannot be repaired locally at the point of use have resulted in the user having to send the entire apparatus to a repair station, which is both expensive and time-consuming, leaving the user without a source of ice for some time.

According to the invention the foregoing and other difficulties not specifically enumerated have been overcome as follows:

In the cabinet form of the apparatus, the entire refrigerating and ice-making equipment (including a motor-driven compressor and condenser and said ice-making vessel and its drive motor and gear box) is mounted on a field-replaceable chassis to permit servicing of the ice-maker apparatus by the installation of a replaceable chassis from a nearby point of distribution.

The sanitary requirements of cleaning and sterilizing all of the parts for making and storing the ice are met primarily by arranging that the assembly of motor and gear box with the auger, vessel, and freezer is easily dismounted and taken apart by removing the motor and gear box from the vessel and from the auger, removing the sidewall of the vessel from the bottom thereof, and removing the auger from around the freezer tube. This disassembly is performed in the preferred embodiment by merely removing two clamping wing nuts. The storage compartment within the cabinet is readily cleaned by opening the service door thereof, a drain being provided at the bottom, and the float-valve controlled storage tank for the water supplied to the freezing vessel is located in the storage compartment for easy cleaning access.

The above-mentioned and other objects and features of this invention, and the manner of obtaining them will become more apparent, and the invention will be best understood by reference to the following description of the invention taken in conjunction with the accompanying drawings comprising FIGS. 1 to 9, wherein:

FIGS. 6 and 7 are right-side views of a portion of the apparatus shown in FIGS. 4 and 5;

Figure 1:
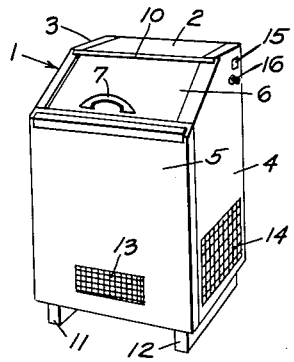
FIGS. 1 and 2 are respectively front-side and rear-side diagonal views of an ice-making cabinet form of apparatus according to the invention.
Figure 2:
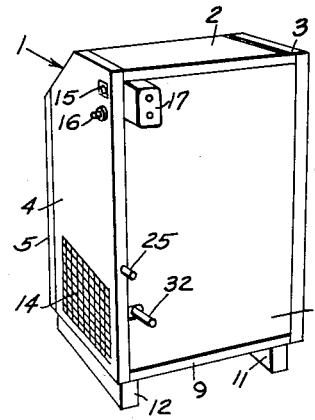
Figure 3:
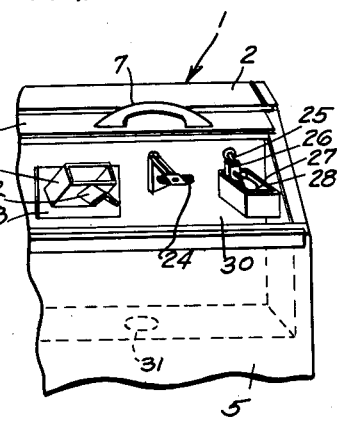
FIG. 3 is a partial diagonal front view of the structure of FIGS. 1 and 2 with the access door open to show the storage bin.

FIG. 8 is a fragmentary front view of vessel tube 80 of FIGS. 6 and 7, showing the discharge opening therein for the produced ice; and FIG. 9 is an end view of the inclined discharge chute along 9—9 of FIG. 7.

Referring first to FIGS. 1 to 5, the ice-making structure is contained within cabinet 1, which has an ice storage compartment 30 into which the produced ice is delivered through the upwardly inclined chute 21.

As viewed externally, cabinet 1 is enclosed by a top panel 2, left and right end panels 3 and 4, front panel 5, access door 6 with its handle 7, and rear panel 8. The cabinet is supported on a bottom panel or structure 9, supported in turn by left and right rearwardly elongated feet 11 and 12. Right panel 4 has devices mounted therein, comprising on-off switch 15 for the internal electrical apparatus, and start or reset button 16. Also, extending outwardly from the rear face of panel 4 is the end of supply tube 25, to which a source of potable water under pressure may be connected, as by a rubber tube (not shown). Drain tube 32 extends rearwardly alongside the rear face of panel 4, through a slot in rear panel 8 (being the drain tube for drain 31 of storage bin 30), and is connectable, as by a rubber tube (not shown), to a suitable waste line. The rearwardly extending portion of tube 32 is anchored by being carried through an opening in bracket 57 (FIG. 5), secured to the back wall of storage bin 30 by screws 58.

Figure 5:
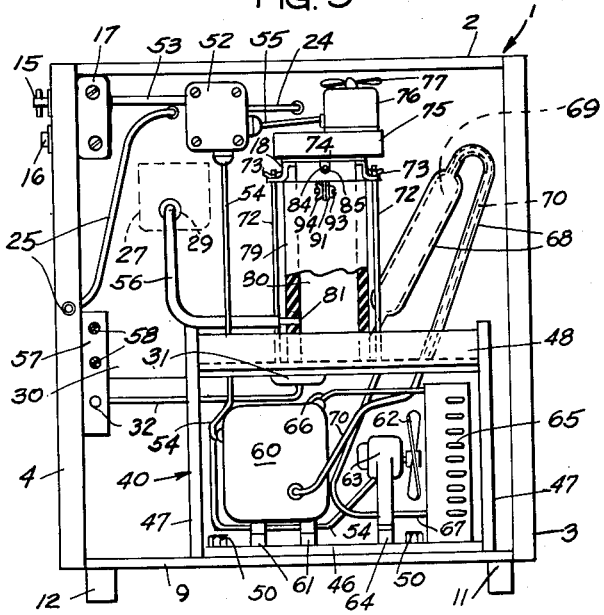
FIG. 5 is a rear view of the structure of FIGS. 1 to 4 with the back panel 8 removed.

Commercial electric power is supplied to the apparatus within cabinet 1 through junction box 17, which has its base attached to the rear portion of panel 4 just within the confines of the cabinet, and extends outwardly through a corner notch in rear panel 8 to permit the usual and approved electrical connection to be made. As seen best in FIG. 5, showing a rear view of cabinet 1 with rear panel 8 removed, the internal electric wiring may include conductors in cable or conduit 53, distribution and control box 52 which includes such relays and/or other control apparatus as may be required, plug-detachable supply cord 55 for auger-drive motor 76, and plug-detachable cord conductors 54 through which the usual electric motor of motor-compressor 60 and condenser-fan motor 63 are supplied. Also extending out of control box 52 is a thermostat tube 24 which extends to and terminates in a bracket-supported portion 24 within storage bin 30. Preferably, tube 24 is connected to well-known control apparatus within box 52 which acts to shut down the ice-making apparatus when the ice level within storage bin 30 reaches thermostat tube 24 and cools it. Essentially, this comprises disconnecting power from the motor of motor-compressor 60, and may also include disconnection of power from motors 63 and 76.

Contained within storage bin 30 is a small water tank or reservoir 27, which contains float valve 26 actuated by float 28 (FIG. 3) to maintain the water supplied through tube 25 to a desired level within tank 27, determinative of the level (indicated at WL in FIG. 7) at which the water is to be maintained within the ice-making vessel or chamber. The outlet for the water stored within tank 27 is through a tube 29 (FIGS. 4 and 5), extending through the rear wall of bin 30 and connected by tube or rubber hose 56 to inlet tube 81 of the upright tube 80 which comprises the defining sidewall of the ice-making vessel.

When storage bin 30 is to be cleaned, any ice therein may be removed to permit the bin to be washed and sterilized as desired, and the cover (not shown) for reservoir 27 may be removed to permit the reservoir to be cleaned as desired, the reservoir being located within the storage bin in about the position shown to facilitate easy access thereto and cleaning thereof.

When the apparatus of FIGS. 1 to 5 is in operation, motor compressor 60 and auger motor 76 are in continuous operation, with local cooling fan 77 being rotated to maintain 76 relatively cool. Condenser fan 62 is driven by its motor 63, either continuously or intermittently depending upon the control arrangement employed. When intermittently operated, it is thermostatically controlled to operate only when condenser 65 becomes heated to a predetermined temperature, for example. Air blown through condenser 65 (of usual construction) passes to the outside through removable vent 14 in end panel 4, intake air being provided through vent 13 in front panel 5 and through a vent (not shown) similar to 14 in end panel 3.

Also, when the apparatus of FIGS. 1 to 5 is in operation, ice is being delivered continuously up chute 21 to drop into storage bin 30, the dropping ice particles being caused to spread in two directions by spreader 22 (FIGS. 3, 7, and 9) to lessen the tendency of the discharged ice to be spread more toward the ends of the storage bin. The spreading tendency is to the right or to the left depending upon which of the two inclined sides of spreader 22 is encountered by any given portion of the discharged ice particles.

The high-pressure gaseous refrigerant is delivered from motor compressor 60 through conduit 66 to the top of condenser 65, wherein the usual liquification of the high-pressure gas is accomplished. High-pressure liquid refrigerant is delivered from the bottom of condenser 65 through tube 67 to the evaporating chamber within the freezer tube contained in vessel 80. At least a portion of the tube or conduit 67 may be the usual capillary tube to maintain compression substantially until the evaporating chamber is reached.

The low-pressure return line from the evaporating chamber to the intake of motor compressor 60 is shown at 70. A substantial portion of the return line is insulated at 68 to minimize the formation of dew or frost on the chilled portion of 70. Return line 70 includes the indicated enlarged or bulb portion within the enlarged portion of insulating cover 68, being the enlarged bulb portion customarily employed in the return line of refrigerating apparatus.

As an aid in fabrication, assembly, and testing during manufacture, and as an aid in servicing and repair, the primary components of the refrigerating and ice-making apparatus are mounted on a chassis 40 (FIGS. 4 and 5) supported on the base 46, which may be secured to the bottom panel or structure 9 of the cabinet 1 as by bolts having the illustrated bolt heads 50. The chassis is seen in rear view in FIG. 5 and in right-end view in FIG. 4. The apparatus items directly supported on base 46 of the chassis include the motor-compressor 60, the condenser fan 62, 63, and the condenser 65. Item 60 may be suspended on the usual cushion feet 61, with item 62, 63 being cushioned at 64. The other apparatus on the chassis 40, comprising the actual ice-making apparatus, is mounted on an elevated platform support 48, supported from base 46 by two upright angle members 47, as in the usual welded-steel construction. The uprights 47 are each braced by a brace rod 49, one of which is shown in the end view of chassis 40 in FIG. 4. In that view, certain components shown elsewhere are omitted for clarity. For example, motor compressor 60 and condenser fan 62, 63 are removed in FIG. 4 to give a full view of condenser 65. The bent or angled construction of braces 49 is such that the horizontal portion of each such brace (one at each end of the chassis) provides convenient carrying and lifting handles for the chassis 40.

It will be observed that the width of base 46 of chassis 40 (as viewed from the end in FIG. 4) is considerably greater than the width of elevated platform 48 when similarly viewed. This arrangement is coordinated with the arrangement of storage bin 30 in the cabinet 1 and permits relatively wide items such as motor compressor 60, fan 62, and condenser 65 to lie partly under storage bin 30 and partly under the elevated platform structure 48 as a matter of space utilization. On the other hand, the structure mounted on platform 48 is of smaller lateral dimensions and is readily contained in the portion of the cabinet lying directly behind the storage bin.

When any part of the apparatus mounted on chassis 40 needs to be serviced or replaced, the chassis may be freed from the cabinet 1 by removing bolts 50, slipping flexible tube 56 off water-supply nipple 81, and removing the plugs in which cables or cords 54 and 55 terminate. The entire chassis 40 may then be slid out of the back of cabinet 1 (with back panel 8 removed) and may be lifted or carried as desired by using the horizontal portion of brace rods 49 at the ends of the chassis. In practice, a replacement chassis is ordinarily provided with all parts complete except for the assembly comprising motor 76 and reducing gear box 75 and without the noted auger hereinafter described, as these items are separately detachable as hereinafter described incident to the cleaning operation and thus need not be furnished as an integral part of the chassis-mounted apparatus unless specifically requested by the user.

Figure 4:
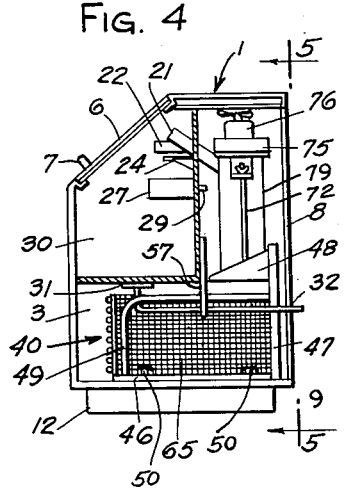
FIG. 4 is a right-end view of the structure of FIGS. 1 to 3 with the right end panel 4 removed.

Referring to FIGS. 6 to 9 in combination with FIGS. 4 and 5, the ice-making apparatus includes a generally cylindrical base block 100 supported on the upper surface of platform 48 of chassis 40 and held in place as by screws 101. Base 100 includes a reduced upwardly extending portion 106 above shoulder 107, sized to be received closely in hollow cylinder 80 which defines the sidewall of the ice-making vessel and which contains water up to a water level as indicated by WL and determined as previously noted by the adjustment of the float within reservoir 28 of FIG. 3. Cylinder 80 is detachable from base 100 upon being freed to be lifted upwardly therefrom, and a sealing connection is made between 80 and 106 by a flexible sealing ring 110 contained in groove 109. Base 100, the upper face of which comprises the bottom of the cylindrical ice-making vessel, is concentrically surmounted by freezer tube or evaporator 130. The evaporator tube is permanently fixed in its indicated position as by brazing or welding and is permanently closed at the top.

Base 100 includes slots 102 and 103 for stub inlet and outlet tubes 104 and 105, which are sealed respectively with the high-pressure and low-pressure tubes 67 and 70 of FIG. 5 in the usual manner. Inlet stub 104 terminates near the bottom of the evaporating chamber enclosed by tube 130, while the return stub 105 terminates near the top as is usual in refrigerating apparatus to minimize the tendency of unevaporated liquid refrigerant to enter the return line under certain conditions of operation.

As shown best in FIG. 7, evaporator tube 130 is closely surrounded (perhaps 3/64 inch clearance on a side) by spiral auger 120, preferably formed from round rod of a suitable grade of high-strength steel of spring hardness to permit it to elongate somewhat under stress without likelihood of breakage in normal intended use. As indicated auger 120 has a left-hand spiral and is operated in a left-hand or counterclockwise direction as viewed from the top, the terminology being that employed in connection with screw threads.

The upper end of auger 120 is supported on the outer end of auger arm 115 by being firmly and rigidly welded thereto, as by welding material indicated at 121. The exposed surface of weld 121 is preferably ground to a smooth cove-like exterior in order to avoid recesses, pockets, or other inaccessible places from a cleaning and sanitary standpoint. Auger arm 115, may be machined from bar stock. It has a square vertical opening 117 which receives the square driving end 114 of shaft 113, extending downwardly from gear box 75 to which drive motor 76 is attached. Shaft 113 is rotated slowly in a left-hand or counterclockwise direction as viewed from above (rotation time being on the order of one rotation per second). The lower end of the drive opening through arm 115 has a circular counterbore to a desired depth to snugly receive insert button 119 which is preferably of a low-friction plastic bearing material such as nylon. The lower face of 119 may be slightly domed as is indicated to confine the contact of support of the auger arm and its auger to a small circular area. As indicated, these items are supported on the smooth upper face of the closed evaporator tube or freezer 130. The items 113, 119, 130, and 80 preferably all have a common vertical center line or axis as nearly as is commercially practicable to avoid mechanical loss of efficiency resulting from undue eccentricity.

As is evident from the illustrated construction, with shaft 113 closely held in alignment by its bearings (not shown) in gear box 75, and with a fairly close but free sliding fit of the square portion 114 of the drive shaft within the drive opening 117 (FIG. 7) of auger arm 115, the top end of auger 120 is fairly closely guided and is caused to be rotated concentrically around freezer tube 130 and within vessel tube 80. Because of the tremendous forces involved in chipping the frozen ice from the surface of freezer tube 130, the fit between auger arm 115 and shaft portion 114 cannot be depended upon to maintain the lower portion of auger 120 reasonably concentric with tubes 80 and 130 because of the inevitable slight play between the auger arm and its drive shaft when the two are not rigidly welded together, and because of the inherent flexibility of auger 120 itself even when made of stiff round rod. Accordingly, in the preferred embodiment, the lower end of auger 120 is held closely to its desired concentric position by cylinder 124 inserted within the lower portion of vessel cylinder 80 and so dimensioned as to provide only a slight commercially tolerant spacing between auger 120 and guide cylinder or tube 124, on the order of a few thousandths of an inch. It has been found that the height of bearing sleeve 124 is sufficient when it equals one full turn or spiral of the auger. A materially greater height is generally undesirable because it restricts the flow of water around the outside of the auger and within tube 80 to replace the volume of water removed as ice. A plastic of low-friction characteristics in contact with metal, of the character of nylon, has been found suitable for use at 124. It has been found that the wear between the auger and sleeve 124 of the noted type of material is negligible after a long period of continuous heavy-duty use.

By limiting the auger elongation permitted, the close proximity between the smooth and rounded lower end 122 of auger 120 and the upper face of washer-like end-thrust member 125 substantially eliminates the noted tendency, especially when the surrounding temperature is low, of the auger to undergo destructive or noisily loud return snap actions as the ice flakes suddenly loosen.

Member 125 is preferably composed of the same low-friction plastic material as sleeve 124, and is illustrated as formed in one piece therewith, but could obviously be produced as a separate washer-like member. It has been found that a clearance between the lower surface of auger tip 122 and the upper face of member 125 on the order of $\frac{1}{32}$ inch is satisfactory. Substantially smaller clearances, while otherwise useable, are difficult to maintain in commercial production in view of the lengths required of auger 120 and of freezer tube 130 on which it is supported by auger arm 115 and thrust bearing member 119. In this regard, it will be observed that the top end portion 126 of auger 130 (FIG. 7) does not align with the trailing side of auger arm 115. Preferably, the lower end of an auger 120 being manufactured is first finished at 122, following which its auger arm 115 is welded to the top spiral of the auger at a location which gives the desired dimension from the undersurface of arm 115 to the lower tip 122, thus leaving a longer or shorter idle upper-end portion 126.

Gear box 75 is preferably provided with a seal (not shown) around shaft 113 to prevent leakage of gear oil or lubricant around auger-drive shaft 113 (FIG. 7). Oil or grease contamination of the water and ice in the ice-making vessel is thereby normally prevented. Independent means is provided, however, at the top of the ice-making vessel to prevent contamination of the vessel contents in the unlikely event of seal leakage. Vessel-closing member 74, 76 is in the flanged-cup form illustrated in cross-section in FIG. 7. Flange 74 is attached to the under side of 75, and drip cup 86 is snugly received within vessel tube 80 to maintain the desired concentricity of shaft 113. Inverted-cup deflector member 88 is secured sealingly and rigidly to shaft 113 and turns therewith. Washer-like pad 89, of felt or other absorbent material, absorbs and retains any small amounts of lubricant which may leak from the gear box. In the event of additional leakage, the lubricant drips from the peripheral depending rim of 88 into the drip cup 86, well outwardly from shaft 113, whence it may drain outwardly through tube 84, located at a lower level than the top of inner circular dam 87 of cup 86.

ICE-MAKING OPERATION—FIGS. 1 TO 9

The ice-making operation will now be described. For this purpose, it may be assumed that the refrigerating apparatus has just been started into operation (motor compressor 60 and auger motor 76 operating) and that the water, as admitted from reservoir 17 of FIGS. 3 to 5 through tube 56 and inlet nipple 81 into vessel cylinder 80, stands at water level WL shown in FIG. 7. Until evaporator 30 is chilled sufficiently for ice to begin to form thereon, auger 120 is turned freely by 76 through 75 and 113 (in a left-hand or counterclockwise direction) through the water contained in the ice-making vessel.

As the water within 80 becomes chilled about to the freezing point, a coat of ice starts to form on the outside of evaporator 130 except near the top and bottom portions which are not contacted by the refrigerant within 130. The tube of ice formed on the surface of 130 applies no particular retarding force to auger 120 until the thickness of the ice equals, and begins to exceed, the clearance between evaporator 130 and the inside surface of auger 120. When this occurs, there is seizure between the affected coils or spirals of auger 120 and the then fully formed layer of ice (not shown) around evaporator 130. Upon such seizure, each seizing coil or coil portion of the slowly turning auger 130 applies a powerful upward force to the encountered ice. There is a corresponding downward force on the auger which is through the auger arm and end-thrust bearing 119 to the center of the upper face of the evaporator tube. There is at least some downward flexing of the auger coils, which progresses until the upward force exerted by the auger is sufficient to shatter and flake away the ice immediately above any auger coil which has seized as described. Commonly, the loosened ice flakes have a thickness up to the clearance between 120 and 130, a vertical dimension up to the vertical center-to-center distance between spirals of the auger, and a width approximating their height or length. Since the described flaking is a form of shattering, the pieces may range in size from comparatively large flakes to small interspersed slivers or granules.

Wherever the ice is flaked away, the concerned part or coil of the auger is relieved of its downward flexing force and thus restores until it again seizingly engages unflaked ice, the freezing and flaking away being a repetitive continuous process. Since the entire supply of water within the ice-making vessel is at about freezing temperature, throughout the ice-making operation the flaked ice has little tendency to be melted by its contact with the surrounding water.

The flaked ice tends to float toward water level WL. Primarily, however, as it collects between the auger coils, it is driven upwardly by the turning auger. This upward drive by auger 120 is greatly assisted by vertical vanes or ribs, such as 127 and 129 spot-welded or otherwise secured to the inner surface of vessel tube 80. Vane 27 has its lower end entering notch 128 in bearing sleeve 124 to prevent the bearing sleeve from rotating within vessel tube 80. Vane 129, which extends upwardly from the top of tube 124 to a point just below the auger arm, is shown only in dotted outline in FIG. 7 since the portion of tube 80 to which it is attached is not located in the section of tube 80 shown in FIG. 7. Any masses of the flaked ice being conveyed by auger 120 is prevented by vanes or ribs 127, 129 from riding idly around the vessel between adjacent auger coils to block the conveying action.

The ice masses carried upwardly by the auger are forced by the auger and by vanes 127, 129 out of the water, into the path of auger arm 115, and out through discharge opening 82.

As succeeding masses of ice are thrust through the opening 82, the masses already pushed therethrough are further thrust by the succeeding masses, causing the ice to accumulate and travel upwardly through chute 21 until the flaked ice begins to spill out of the end of the chute and drop onto or alongside diverter 22 and into the storage bin.

The rate of travel of the flaked ice up chute 21 is comparatively slow. Accordingly, any excess water adhering to and between the ice flakes being pushed up the chute has ample time to drain therefrom and to return to the water within the ice-making vessel. The discharged ice flakes are accordingly very much drier when they reach the top of the chute than when first pushed into the entrance of the chute. Additionally, chute 21, with the disclosed auger-arm and guide-vane arrangement for forcing ice into it, permits a much higher filling of the storage bin 30 than could be otherwise accomplished.

As the foregoing action continues, fresh water is supplied from reservoir 17 to maintain the level thereof at WL (FIG. 7).

When the ice-making structure of FIGS. 1 to 9 is to be cleaned and sterilized, it may be taken apart (preferably with the water supply to reservoir 27 shut off) by disconnecting water tube 56 from nipple 81 of vessel tube 80, and loosening and removing both wing nuts 73 of FIG. 5. When this has been done, the assembly comprising motor and gear-box items 76, 75 with attached member 74 and clamp brackets 78, attached to cup flange 74, may be lifted from vessel tube 80, leaving the auger within the vessel tube because of the slip fit of square portion 114 of shaft 113 with the opening in the auger arm. This detachable connection between the drive shaft and the auger is essential to the disclosed cabinet construction, since there is insufficient head room within the cabinet 1 to permit the assembly to be lifted free with the auger attached.

The auger assembly may now be removed through the top of the vessel tube 80. Chute 21 is loosened from tube 80 by removing bolt 93, permitting clamp arms 91 to be raised. Vessel tube 80 may now be lifted from its assembled position to expose the parts within for such cleaning and sterilizing as is desired, following which the parts may be restored to their illustrated assembled position. A locating notch (FIG. 6) in tube 80 receives locating pin 108, and drain tube 84 is received in locating notch 85 in tube 80. The assembly is tightened in place by threading and tightening wing nuts 73 on hold-down rods 72 to clamp the entire ice-making assembly securely to its elevated base plate 48.

The relatively large opening (FIG. 3) through the back wall of bin 30, covered by finish plate 23 (which may be of flexible rubber-like material if desired) permits chute 21 and its attached diverter 22 to be removed for sterilization, if desired, while the ice-making apparatus is disassembled as described.

While we have described above the principles of our invention in connection with specific apparatus, it is to be clearly understood that this description is made only by way of example and not as a limitation to the scope of our invention.

We claim:

1. In an ice-making apparatus comprising an upright cylindrical ice-making water vessel for containing water to be made into ice, a base having an inward cylindrical portion serving as the bottom of the water vessel and surrounded by an annular shoulder, the lower portion of the water vessel resting on the annular shoulder and being removably telescoped with the inward cylindrical portion of the base, a refrigerated ice-making cylinder extending concentrically upwardly within the vessel from the inward cylindrical portion of the base, an ice remover within the vessel surrounding the ice-making cylinder, drive means surmounting the vessel, a shaft extending downwardly from the drive means into turning engagement with the ice remover, the resultant turning of the ice remover removing and raising ice formed around the ice-making cylinder for ejection from the ice-making vessel, means for removably supporting the drive means atop of the vessel, and means removably clamping the base and drive means together comprising at least two clamp means each extending between a part fixed with the drive means and a part fixed with the base, whereby the drive means and ice remover may be readily loosened and removed from the ice-making vessel and the ice-making vessel can be readily removed from the base for cleaning accessibility.

2. In an ice-making apparatus according to claim 1, the further improvement which comprises means keying said shaft and said ice remover for turning together, while permitting the shaft to be raised upwardly out of engagement with the ice remover when the said drive means is removed, whereby less head room is required for assembling and removing the drive means and ice remover than if the two were assemblable and removable only together.

3. A sanitary cabinet form of ice-making and ice-storage apparatus, comprising a cabinet including ice-making apparatus and a bin for the storage of ice, the bin being readily accessible and including a drain for carrying away water resulting from the melting of ice in the bin and for carrying away wash water when the bin is cleaned, the ice-making apparatus including an ice-making vessel for containing water to be made into ice, means for converting the water into ice, means for removing the ice from the vessel, and drive means actuating the said means for removing the ice from the vessel, means including an ice chute for delivering the removed ice to the storage bin, means including a float-controlled reservoir for maintaining a supply of water at a desired level in the ice-making vessel, the said reservoir being located in the storage bin for easy accessibility and to permit its cleaning and washing in a location where the wash water will be carried away through the drain, and means facilitating the disassembly of the ice-making vessel and of the apparatus therein for such cleaning and sterilizing as may be desired, the said drive means being separable from the said means for removing the ice from the vessel, whereby the ice-making apparatus, together with all of the apparatus within the cabinet with which the water to be made into ice and the ice itself comes into contact, may be readily disassembled for maintenance in a sanitary condition.

4. In an ice-making apparatus comprising an upright ice-making vessel for containing water to be made into ice, an upright refrigerated ice-making cylinder, an ice remover surrounding the ice-making cylinder, drive means located above the ice-making vessel and including a lubricated shaft extending downwardly to the ice remover for driving the ice remover, the improvement which comprises means for precluding lubricant from traveling down the shaft to contaminate the contents of the ice-making vessel, the precluding means including an annular cup surrounding the drive shaft, a drain leading outwardly from said annular cap beyond the confines of the ice-making vessel and, a lubricant-barring disc sealingly attached to and rotatable with said shaft and located between said drive means and said annular cup, said disc carrying any lubricant tending to run down the shaft outwardly from the shaft to drain into said cup.

References Cited in the file of this patent

UNITED STATES PATENTS

| | | |
|---|---|---|
| 2,137,541 | Muffly | Nov. 22, 1938 |
| 2,407,058 | Clum | Sept. 3, 1946 |
| 2,596,876 | Taecker | May 13, 1952 |
| 2,825,209 | Nelson et al. | Mar. 4, 1958 |
| 2,913,169 | Wilsmann | Nov. 17, 1959 |
| 2,916,169 | Duckett | Dec. 8, 1959 |

FOREIGN PATENTS

| | | |
|---|---|---|
| 220,263 | Australia | Feb. 12, 1959 |